(12) United States Patent
Wang et al.

(10) Patent No.: US 7,903,300 B2
(45) Date of Patent: Mar. 8, 2011

(54) SCANNING DEVICE AND METHOD THEREOF

(75) Inventors: Chih-Yi Wang, Chiayi County (TW); Chung-Chih Luo, Changhua (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 12/232,357

(22) Filed: Sep. 16, 2008

(65) Prior Publication Data

US 2009/0073518 A1    Mar. 19, 2009

(30) Foreign Application Priority Data

Sep. 17, 2007 (TW) ................................ 96134748 A

(51) Int. Cl.
*H04N 1/04* (2006.01)
(52) U.S. Cl. ......... 358/488; 358/486; 358/497; 358/483; 358/482; 358/474
(58) Field of Classification Search .............. 358/488, 358/486, 497, 496, 474, 483, 482; 399/370, 399/371, 367, 211
See application file for complete search history.

(56) References Cited

U.S. PATENT DOCUMENTS

| | | | | |
|---|---|---|---|---|
| 5,907,413 A | * | 5/1999 | Han | 358/497 |
| 5,929,435 A | * | 7/1999 | Han | 250/234 |
| 2005/0191100 A1 | * | 9/2005 | Ooshima et al. | 399/370 |

FOREIGN PATENT DOCUMENTS

| | | |
|---|---|---|
| CN | 1193149 A | 9/1998 |
| CN | 1477847 A | 2/2004 |
| JP | 2003/295335 A | 10/2003 |

* cited by examiner

*Primary Examiner* — Cheukfan Lee

(57) ABSTRACT

A scanning device and a method thereof are provided. The scanning device includes a scanning platform and an optical chassis. The scanning platform is for supporting an object. A reference origin is defined on the scanning platform for positioning the object. The optical chassis is located at a detection position while detecting a position of the object. The optical chassis includes a carriage, an image sensor and a detector set. The image sensor is disposed in the carriage for capturing an image of the object and generating image data of the object. The detector set is mounted on the carriage for detecting whether the presence of the object is located at the reference origin.

10 Claims, 9 Drawing Sheets

US 7,903,300 B2

SCANNING DEVICE AND METHOD THEREOF

This application claims the benefit of Taiwan application Serial No. 96134748, filed Sep. 17, 2007, the subject matter of which is incorporated herein by reference.

BACKGROUND OF THE INVENTION

1. Field of the Invention

The invention relates in general to a scanning device and a method thereof, and more particularly to a scanning device detects the presence of an object at a reference origin and a method thereof.

2. Description of the Related Art

Referring to FIG. 1, a perspective of a conventional scanning device is shown. The scanning device 100 includes a scanning platform 110 and an optical chassis 130. An object 190 is placed on the scanning platform 110.

The scanning device 100 includes a first detecting unit 120 and a second detecting unit 140 for determining size of the object 190. Referring to FIG. 2A, a perspective of a first detecting unit and a second detecting unit of FIG. 1 determining the size of an object is shown. The first detecting unit 120 is disposed in response to a size range A1 (such as A4 size). The second detecting unit 140 is disposed in response to a size range A2 (such as letter size).

Referring to both FIGS. 2B and 2C, two perspectives of an object placed on a scanning platform of FIG. 1 are shown. The size of the object 190 is similar to the size range A1. As indicated in FIG. 2B, when the object 190 is aligned with a reference origin 110', the object 190 will be detected by the first detecting unit 120, the scanning device 100 will scan the object 190 as if scanning an A4 size document, and the optical chassis 130 will capture a complete image of the object 190.

As indicated in FIG. 2C, when a position of the object 190 on the scanning platform 110 is deviated from the reference origin 110', the object 190 will still be detected by the second detecting unit 140, and the scanning device 100 will scan the object 190 as if scanning a letter size document. Thus, the optical chassis 130 cannot capture the complete image of the object 190.

According to the above disclosure, when the position of the object 190 on the scanning platform 110 is deviated from the reference origin 110', an image-capturing range will be erroneously defined and caused great inconvenience to the user.

SUMMARY OF THE INVENTION

The invention is directed to a scanning device and a method thereof. The scanning device comprises a detecting module having a detector set corresponding to a reference origin on a scanning platform in the scanning device, for detecting the presence of an object at the reference origin so as to capture a complete image of the object.

According to above aspect of the present invention, a scanning device is provided. The scanning device includes a scanning platform for supporting an object and an optical chassis. The optical chassis is disposed in the scanning device and includes a carriage, an image sensor and a detector set. The image sensor is disposed in the carriage for capturing an image of the object and generating image data of the object. The detector set is mounted on the carriage for detecting the presence of the object according to the reference origin.

According to a second aspect of the present invention, a scanning method used in a scanning device is provided. The scanning method includes the following steps. First, detecting the presence of an object at a reference origin by using a detector set mounted on a carriage of an optical chassis of the scanning device; second, sending out an error message if the presence of the object is not detectable at the reference origin; and then, capturing an image of the object if the presence of the object is detectable at the reference origin.

The invention will become apparent from the following detailed description of the preferred but non-limiting embodiments. The following description is made with reference to the accompanying drawings.

DETAILED DESCRIPTION OF THE INVENTION

First Embodiment

Figure 1:
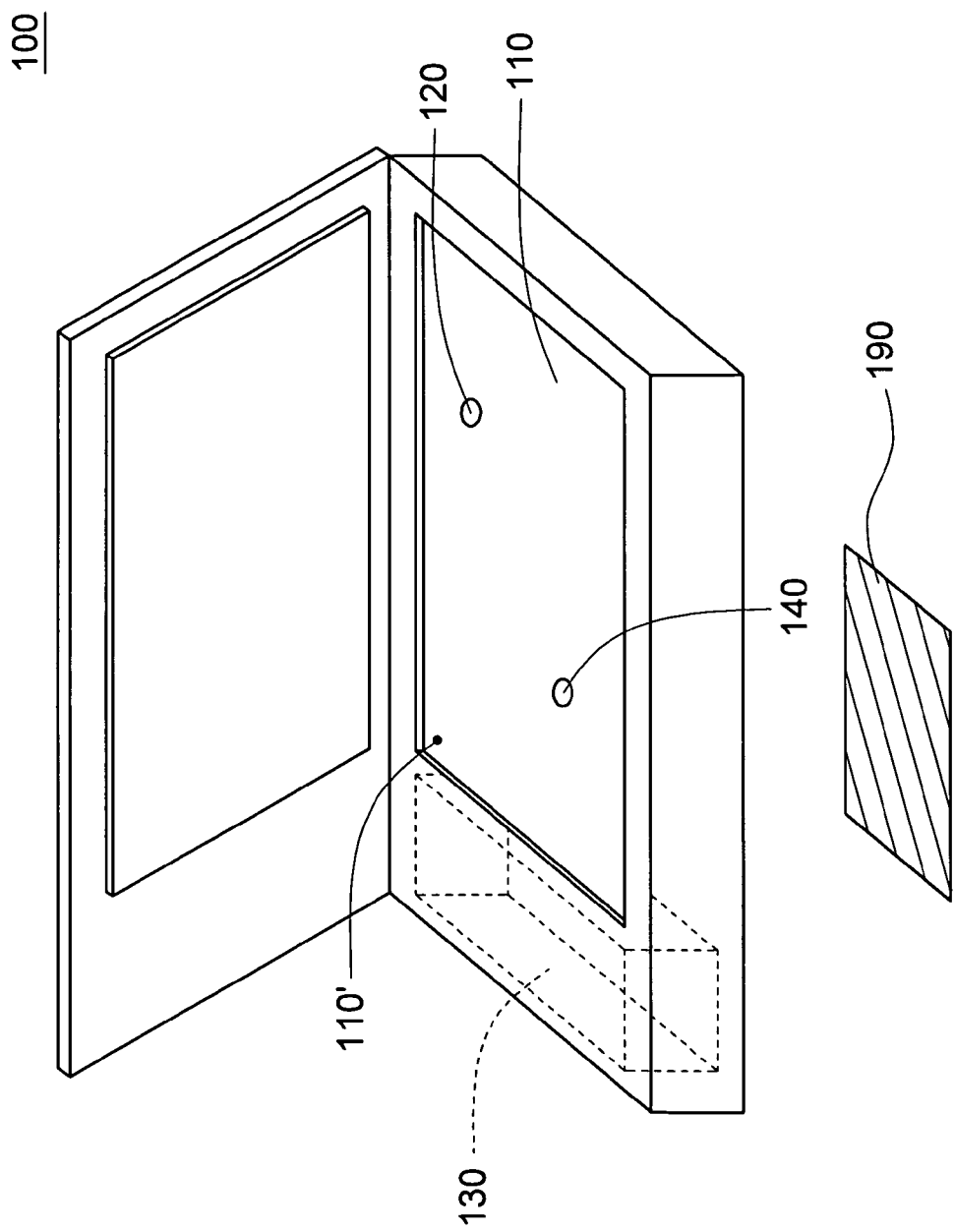
FIG. 1 shows a perspective of a conventional scanning device.
Figure 2A:
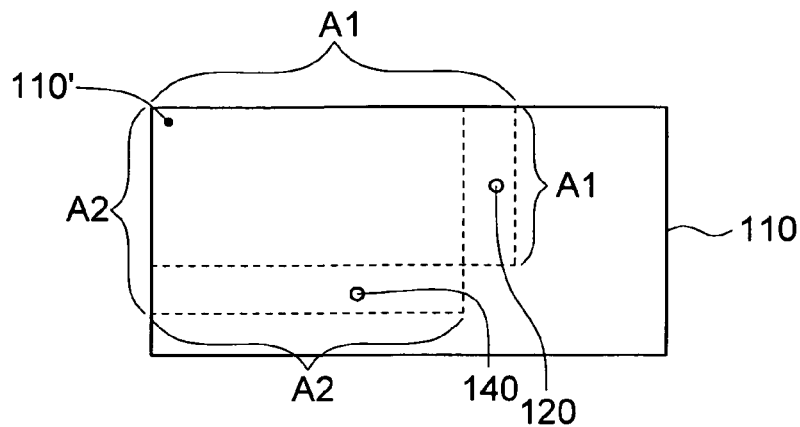
FIG. 2A shows a perspective of a first detecting unit and a second detecting unit of FIG. 1 determining the size of an object.
Figure 2B:
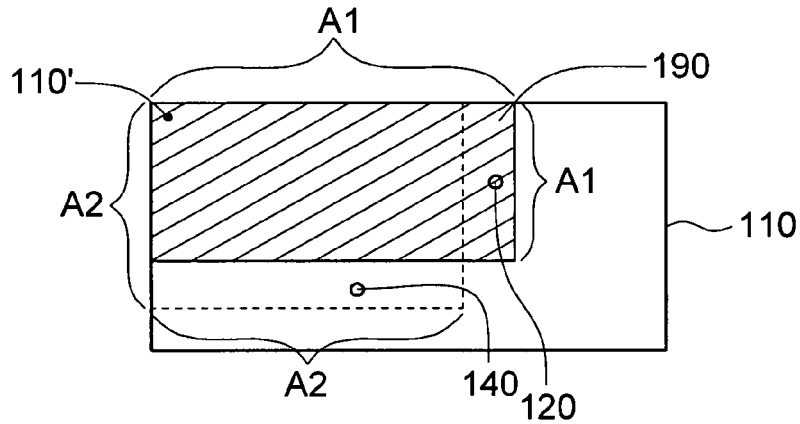
FIGS. 2B and 2C show perspectives of an object placed on a scanning platform of FIG. 1.
Figure 2C:
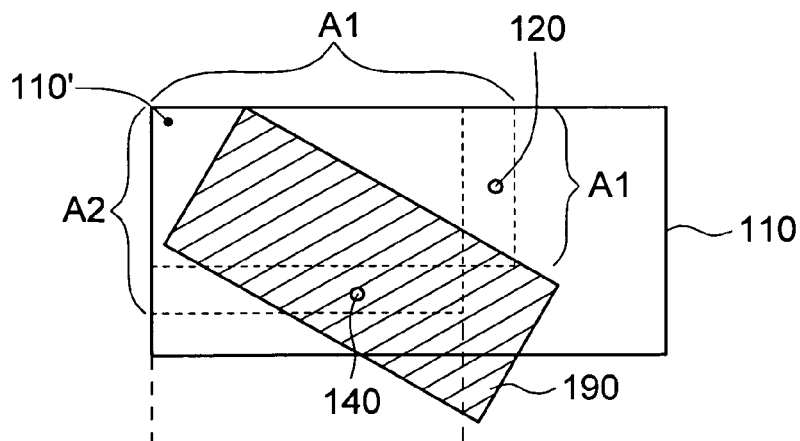
Figure 3A:
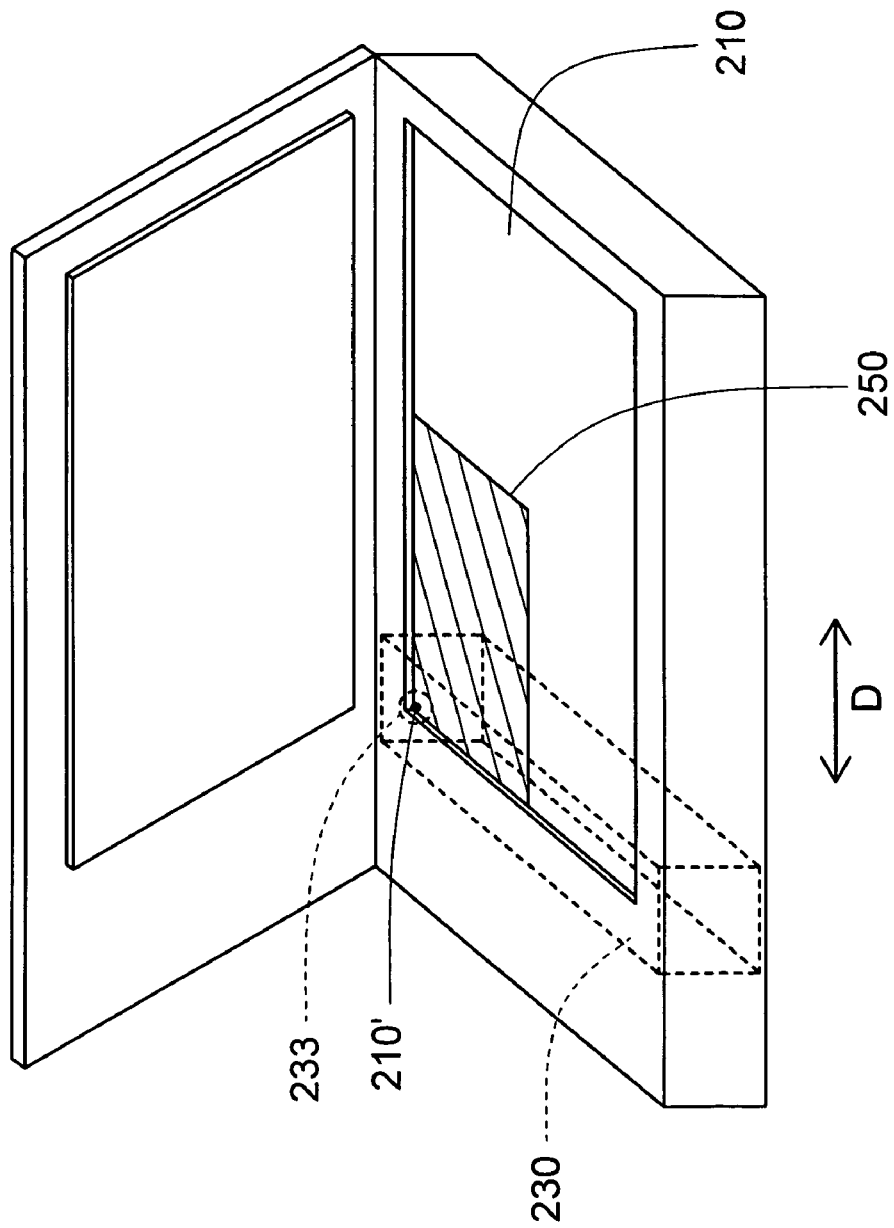
FIG. 3A shows a perspective of a scanning device according to a first preferred embodiment of the invention.
Figure 3B:
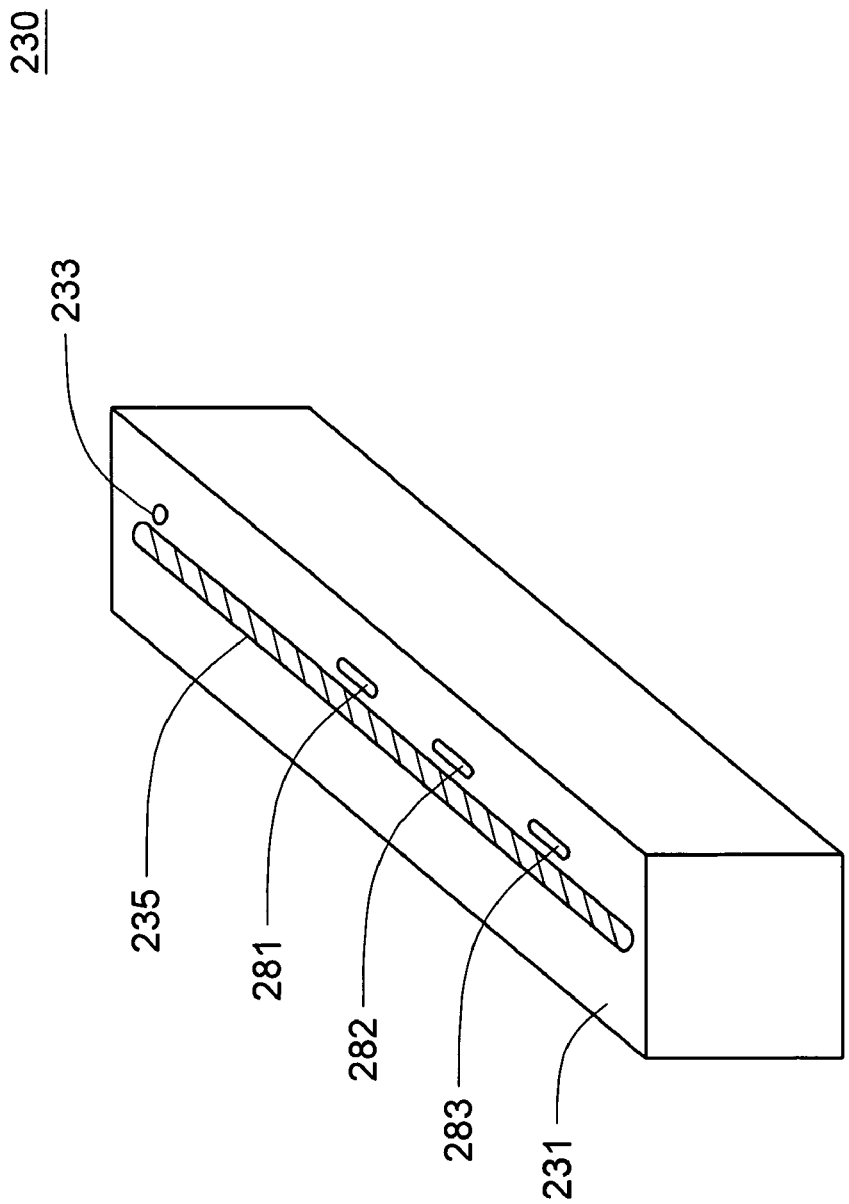
FIG. 3B shows a perspective of an optical chassis of FIG. 3A.

FIG. 3A shows a perspective of a scanning device according to a first preferred embodiment of the invention. FIG. 3B shows a perspective of an optical chassis of FIG. 3A. As indicated in FIG. 3A, the scanning device 200, being a flatbed-type scanner, includes a scanning platform 210 and an optical chassis 230. The scanning platform 210 is for supporting an object 250 and a reference origin 210' is defined on the scanning platform 210 for positioning the object 250. As indicated in FIG. 3B, the optical chassis 230 is located at a detection position while the object is detected. The option chassis 230 includes a carriage 231, an image sensor (not illustrated) and a detector set 233. The detector set 233 is mounted on the carriage 231 for detecting whether the presence of the object 250 is located at the reference origin 210'. The image sensor is disposed in the carriage 231 for capturing an image of the object 250 via an image-capturing window 235 and generating image data of the object 250. Before capturing the image of the object 250, the scanning device 200 detects the presence of the object 250 at the reference origin 210' by the detector set 233, hence avoiding the position of the object 250 on the scanning platform 210 being deviated form the reference origin 210' or the image-capturing range being erroneously defined.

Figure 4A:
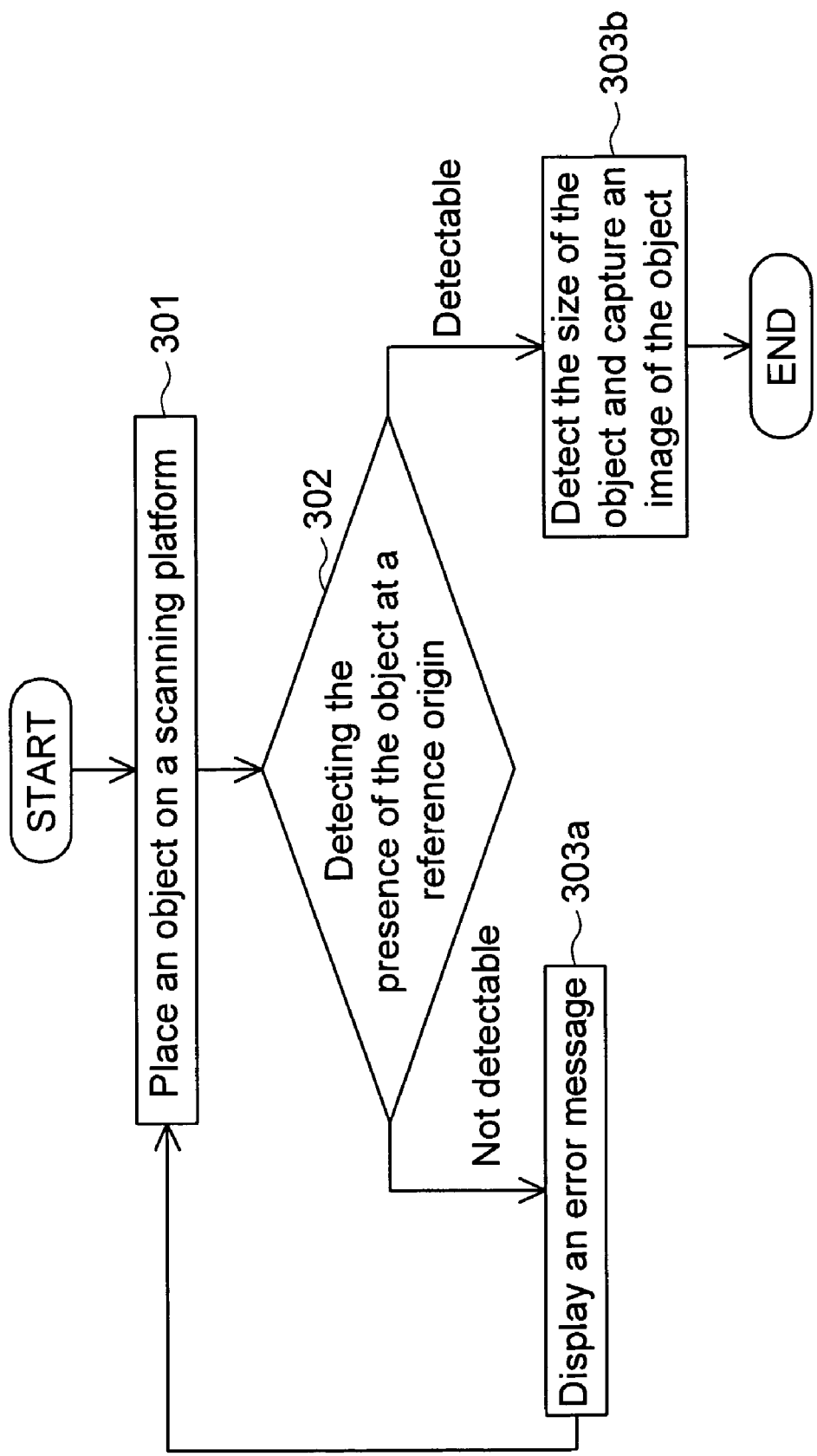
FIG. 4A shows a flowchart of a scanning method according to a first embodiment of the invention.

FIG. 4A shows a flowchart of a scanning method according to a first embodiment of the invention. In the step 301, the object 250 is placed on the scanning platform 210.

Next, the method proceeds to the step 302, whether the presence of the object 250 is located at the reference origin 210' is detected by the detector set 233 mounted on the optical chassis 230. If the presence of the object 250 at the reference origin 210' is not detectable, the step 303a is executed. If the presence of the object 250 at the reference origin 210' is detectable, the step 303b is executed.

Figure 4B:
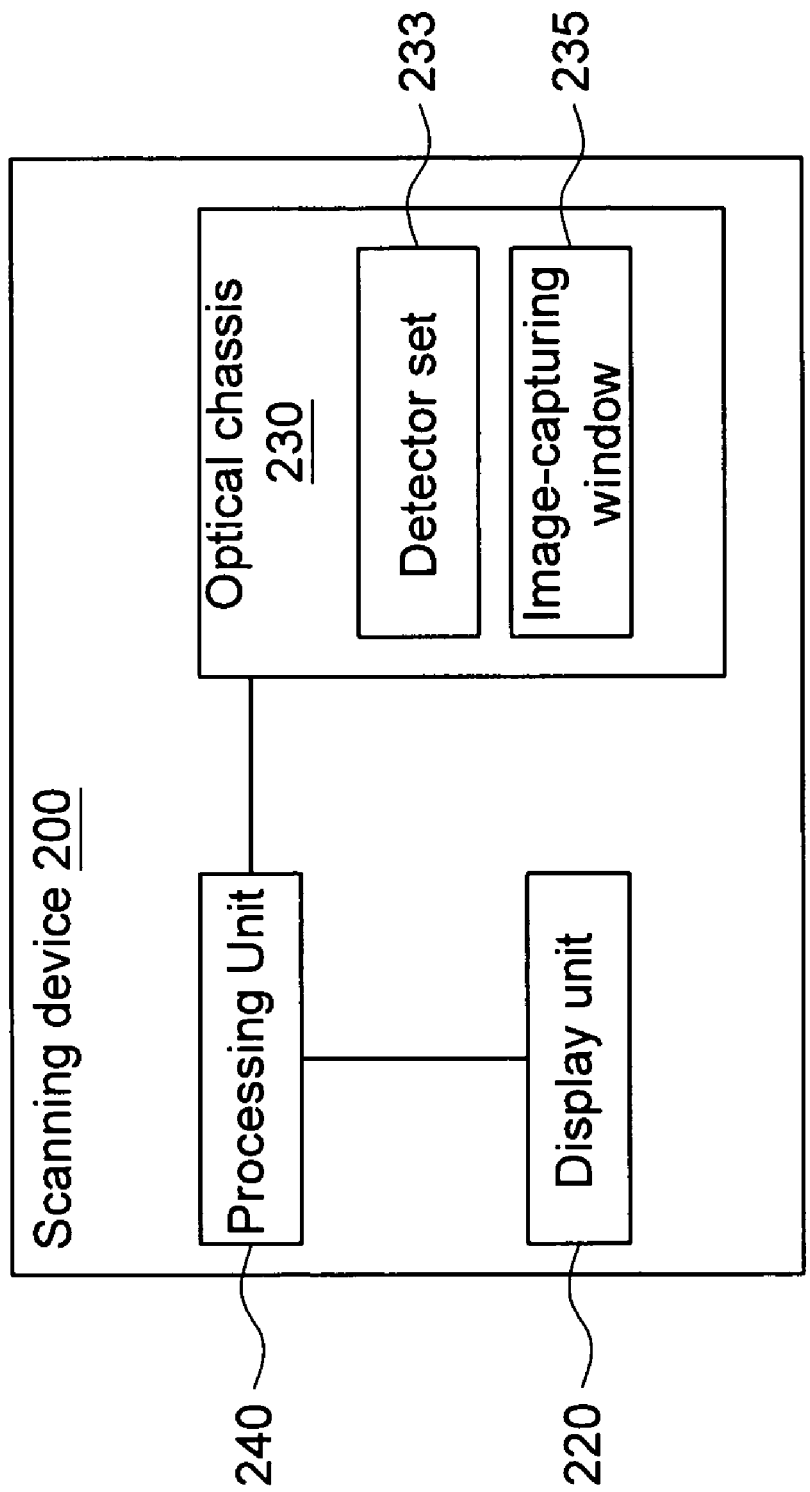
FIG. 4B shows a block diagram of the scanning device of FIG. 3A.

Referring to FIG. 4B, a block diagram of the scanning device of FIG. 3A is shown. The scanning device 200 further includes a display unit 220 and a processing unit 240. In the step 303a, an error message is sent by the processing unit 240 and is displayed on the display unit 220 to inform the user. As the presence of the object 250 at the reference origin 210' is not detectable, the image sensor cannot capture the complete image of the object 250. Thus, after the step 303a, the step of the method returns to the step 301, and the object 250 must be placed again.

As indicated in FIG. 3B, the optical chassis 230 further includes three size detecting units 281, 282 and 283. The size detecting units 281, 282 and 283 are mounted on the carriage 231 and separated at a particular interval, wherein the positions of the size detecting units 281, 282 and 283 correspond to document sizes such as A4 size, letter size and B4 size.

In the step 303b, the optical chassis 230 detects the size of the object 250 by the size detecting units 281, 282 and 283. Next, the optical chassis 230 captures the image of the object 250. In the present embodiment of the invention, the optical chassis 230 is moveable in the scanning device 200 for capturing the image of the object 250. The processing unit 240, according to the result of detection by using the size detecting units 281, 282 and 283, controls the optical chassis 230 to move in a scanning direction D such that the image sensor captures a complete image of the object 250.

In addition, as the detector set 233 and the size detecting units 281, 282 and 283 are mounted on the optical chassis 230, the detector set 233 and the size detecting units 281, 282 and 283 move synchronously with the image sensor when the image sensor captures an image. Thus, the detector set 233 and the size detecting units 281, 282 and 283 neither block the image-capturing window 235 nor affect the image sensor to capture the image of the object 250.

According to the present embodiment of the invention, before the scanning device 200 scans the object 250, the presence of the object 250 at the reference origin 210' is detected by the detector set 233 first, hence avoiding the size of the object 250 being erroneously determined or the optical chassis 230 failing to capture the complete image of the object 250.

Second Embodiment

Figure 5A:
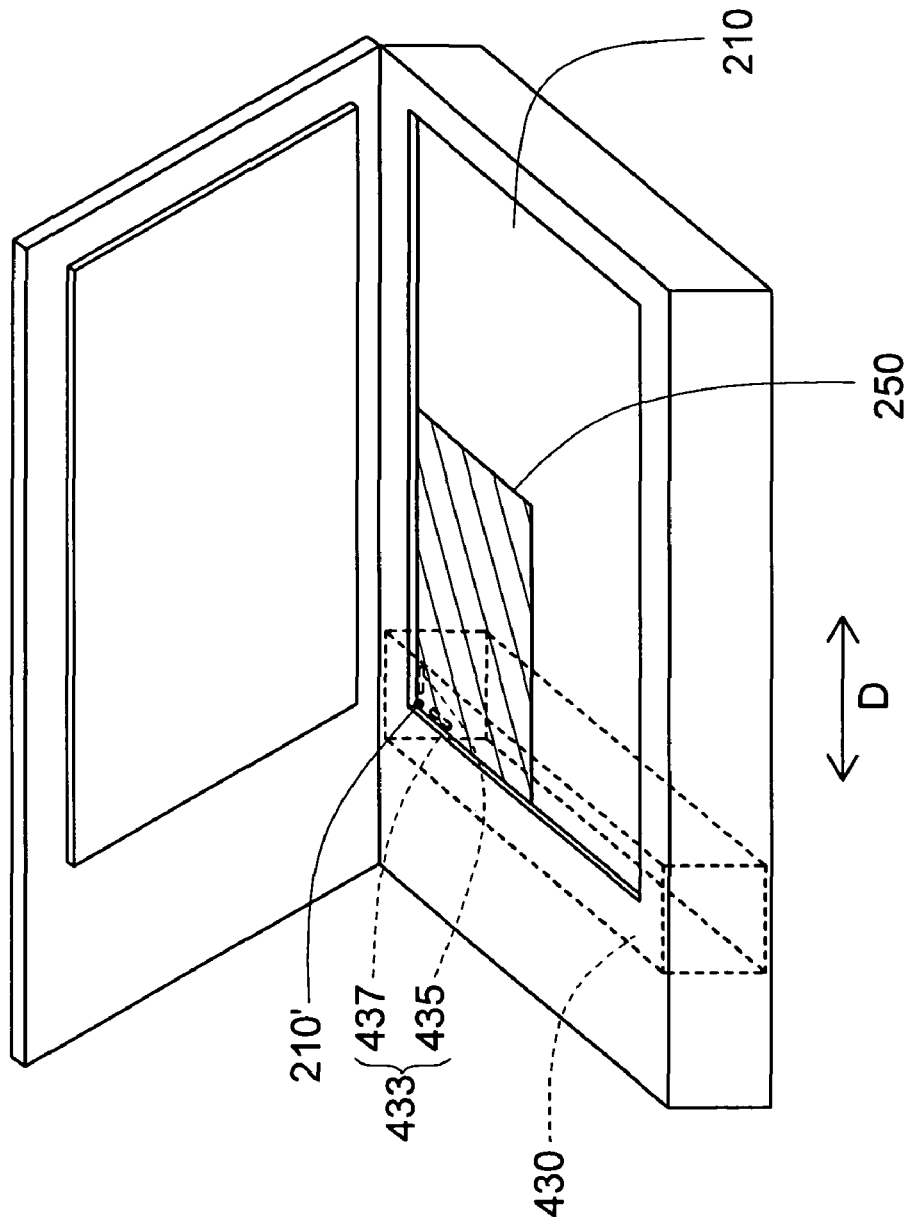
FIG. 5A shows a perspective of a scanning device according to a second preferred embodiment of the invention.
Figure 5B:
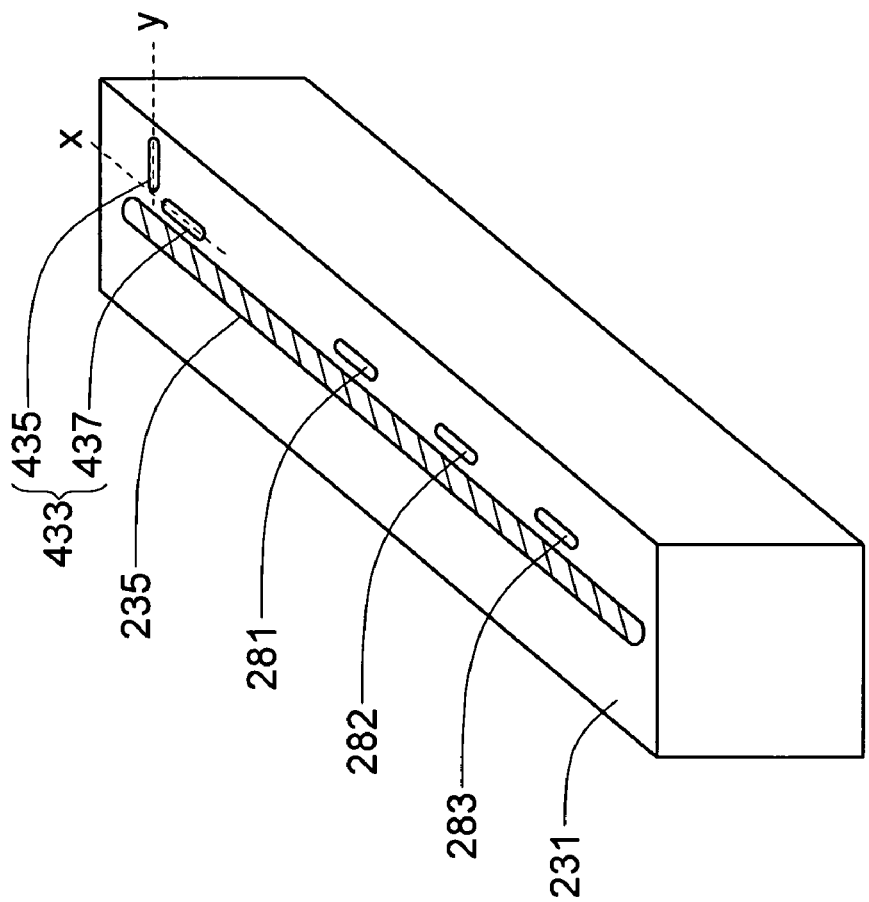
FIG. 5B shows a perspective of an optical chassis of FIG. 5A.

FIG. 5A shows a perspective of a scanning device according to a second preferred embodiment of the invention. FIG. 5B shows a perspective of an optical chassis of FIG. 5A. The optical chassis 430 of the scanning device 400 of the present embodiment of the invention differs with the optical chassis 230 of the first embodiment in that the detector set 433 includes two detecting units (the first detecting unit 435 and the second detecting unit 437), and other similarities are not repeated here. The first detecting unit 435 is extending along a first axis y, and the second detecting unit 437 is extending along a second axis x. The first axis y is substantially perpendicular to the second axis x, and the first axis y is substantially parallel to a scanning direction D. Before the optical chassis 430 scans, the presence of the object 250 at the reference origin 210' is detected by the first detecting unit 435 and the second detecting unit 437, and a condition will be detected when the position of the object 250 on the scanning platform 210 is deviated from the reference origin 210' so that the image-capturing range will not be erroneously defined.

Figure 6:
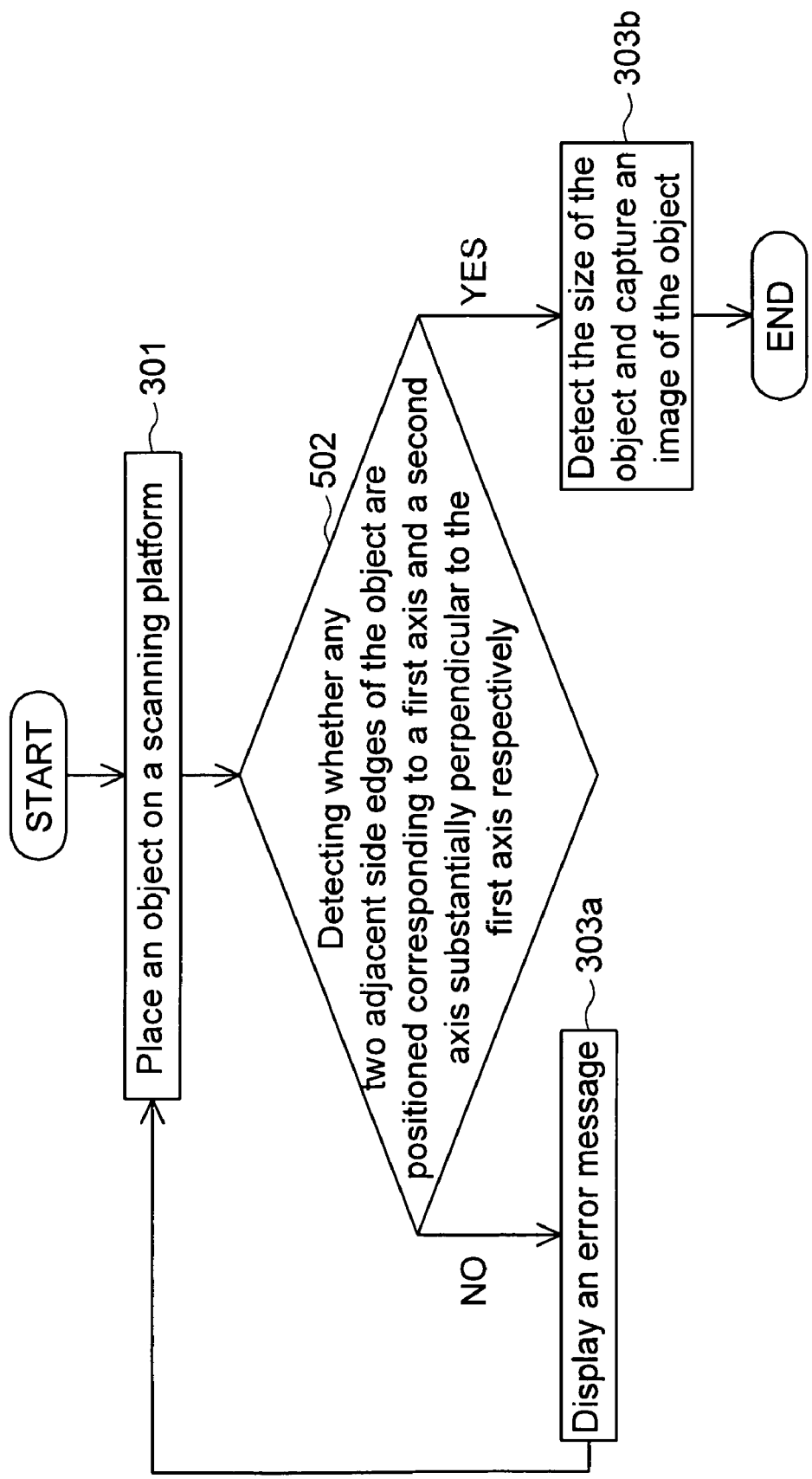
FIG. 6 shows a flowchart of a scanning method according to a second embodiment of the invention.

Referring to FIG. 6, a flowchart of a scanning method according to a second embodiment of the invention is shown. In the step 502 of detecting whether the presence of the object 250 is located at the reference origin 210' by using the detector set 433 mounted on the optical chassis 430 of the scanning device 400, the detector set 433 detects whether any two adjacent side edges of the object 250 are positioned corresponding to a first axis y and a second axis x. In details, the optical chassis 430 detects whether a lateral side edge of the object 250 is positioned corresponding to the first axis y by using the first detecting unit 435 and detects whether the other lateral side edge of the object 250 is positioned corresponding to the second axis x by using the second detecting unit 437. If any two adjacent side edges of the object 250 are not positioned corresponding to the first axis y and the second axis x, the step 303a is executed. If two adjacent side edges of the object 250 are positioned corresponding to the first axis y and the second axis x, then the step 303b is executed. The steps 301, 303a and 303b of the present embodiment of the invention are the same with that of the first embodiment and are not repeated here.

Before the optical chassis 430 of the present embodiment of the invention captures an image of an object 250, whether any two adjacent side edges of the object 250 are positioned corresponding to the first axis y and the second axis x is detected first. After any two adjacent side edges of the object 250 are positioned corresponding to the first axis y and the second axis x is detected, the size of the object 250 is detected by the size detecting units 281, 282 and 283 when capturing the image of the object 250. Thus, as the object 250 is aligned with two axes perpendicular to each other, the size of object will not be misjudged.

Preferably, the first detecting unit 435 and the second detecting unit 437 are two linear detectors so that the range and sensibility of detection are increased. Besides, the first detecting unit 435 and the second detecting unit 437 can respectively comprise a plurality of micro-detectors. The plurality of micro-detectors of the first detecting unit 435 are arranged along the first axis y and the plurality of micro-detectors of the second detecting unit 437 are arranged along the second axis x so as to increase the accuracy of the first detecting unit 435 and the second detecting unit 437.

Despite the present embodiment of the invention, the first detecting unit 435 and the second detecting unit 437 are exemplified by two linear detectors, and anyone who is skilled in the technology of the invention will understand that the shapes of the first detecting unit 435 and the second detecting unit 437 are not limited thereto. The first detecting unit 435 and the second detecting unit 437 can have other shapes and can be circular detecting units or rectangular detecting units. Neither the shape nor the number of the size detecting units 281, 282 and 283 is limited. For example, the size detecting units can consist of four, five or ten detecting units of different shapes. Any designs detecting the presence of the object at the reference origin by using a detecting unit and further sending an error message to inform the user are within the scope of protection of the invention.

According to the above disclosure, despite the scanning device is exemplified by a movable optical chassis, the exemplification is not for limiting the scope of the invention. For example, the scanning device can also include an automatic document feeder (ADF) for transporting a document to a scanning platform. During the process of moving the document, the optical chassis is located at a detection, position while detecting whether the presence of the document is located at the reference origin, and continues to complete scanning without being moved.

According to the scanning device and method thereof disclosed in the above embodiments of the invention, the presence of the object at a reference origin is detected by a detector set. Only after the presence of the object is detectable, the image of the object can be captured. The size of the object is detected by several size detecting units. All detecting units are mounted on an optical chassis. Such disposition does not interfere with the image sensor, and is capable of accurately detecting the object by being nearest to the scanning platform.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning device, comprising:
   a scanning platform for supporting an object, wherein a reference origin is defined on the scanning platform for positioning the object; and
   an optical chassis, located at a detection position, comprising:
      a carriage;
      an image sensor disposed in the carriage for capturing an image of the object and generating image data of the object; and
      a detector set, mounted on the carriage for detecting the presence of the object at the reference origin, wherein the detector set comprises:
         a first detecting unit extending along a first axis; and
         a second detecting unit extending along a second axis, wherein the second axis is substantially perpendicular to the first axis.

2. The scanning device according to claim 1, wherein the first axis is substantially parallel to one side of the scanning platform.

3. The scanning device according to claim 1, wherein the first detecting unit and the second detecting unit are linear detectors.

4. The scanning device according to claim 1, wherein the first detecting unit and the second detecting unit respectively comprise a plurality of detectors, wherein the detectors of the first detecting unit and the detectors of the second detecting unit are arranged along the first axis and the second axis respectively.

5. The scanning device according to claim 1, wherein the optical chassis further comprises:
   a plurality of size detecting units mounted on the carriage and separated at a predetermined interval for detecting the size of the object.

6. The scanning device according to claim 1, further comprising:
   a display unit for displaying an error message when the presence of the object is not detectable by using the detector set.

7. The scanning device according to claim 1, wherein the optical chassis is fixed at the detection position, the object is a sheet of paper, the scanning device further comprises:
   an automatic document feeder (ADF) for automatically transporting the paper to the scanning platform.

8. The scanning device according to claim 1, wherein the scanning device is one of a flatbed-type scanner and a sheet-fed-type scanner.

9. A scanning method used in a scanning device having an optical chassis, wherein the optical chassis includes a carriage, and the carriage further includes a detector set having a first detecting unit extending along a first axis and a second detecting unit extending along a second axis substantially perpendicular to the first axis, the method comprising the steps of:
   detecting the presence of an object at a reference origin by using the detector set mounted on the carriage;
   sending out an error message if the presence of the object is not detectable at the reference origin by the detector set; and
   capturing an image of the object if the presence of the object is detectable at the reference origin by the detector set;
   wherein the step of detecting the presence of the object at the reference origin comprises:
   detecting whether any two adjacent side edges of the object are positioned corresponding to the first axis and the second axis by the first detecting unit and the second detecting unit respectively.

10. The scanning method according to claim 9, further comprising:
    moving one of the optical chassis and the object;
    capturing the image of the object; and
    detecting the size of the object.

* * * * *